(12) United States Patent
Shindo et al.

(10) Patent No.: US 7,879,937 B2
(45) Date of Patent: Feb. 1, 2011

(54) MOLDED POLYMER MATERIAL AND GOLF BALL

(75) Inventors: Jun Shindo, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 382 days.

(21) Appl. No.: 11/350,097

(22) Filed: Feb. 9, 2006

(65) Prior Publication Data

US 2007/0184916 A1   Aug. 9, 2007

(51) Int. Cl.
A63B 37/00 (2006.01)
C08L 9/00 (2006.01)
C08L 33/02 (2006.01)

(52) U.S. Cl. .................. 524/399; 525/193; 525/194; 525/196; 525/201; 525/221; 473/371; 473/372

(58) Field of Classification Search .................. None
See application file for complete search history.

(56) References Cited

U.S. PATENT DOCUMENTS

| | | | |
|---|---|---|---|
| 6,930,150 B2 | 8/2005 | Kim | |
| 2001/0006998 A1* | 7/2001 | Takesue et al. | 525/221 |
| 2002/0086745 A1* | 7/2002 | Rajagopalan | 473/371 |
| 2003/0130061 A1* | 7/2003 | Rajagopalan et al. | 473/354 |
| 2003/0130067 A1* | 7/2003 | Fujisawa et al. | 473/376 |
| 2005/0009641 A1* | 1/2005 | Higuchi et al. | 473/371 |
| 2005/0170910 A1* | 8/2005 | Hayashi | 473/371 |
| 2005/0250601 A1* | 11/2005 | Kim et al. | 473/371 |
| 2006/0264269 A1* | 11/2006 | Rajagopalan et al. | 473/371 |
| 2007/0049419 A1* | 3/2007 | Egashira et al. | 473/351 |
| 2008/0058474 A1* | 3/2008 | Okamoto et al. | 525/236 |

FOREIGN PATENT DOCUMENTS

| GB | 1148529 | * | 4/1969 |
|---|---|---|---|
| JP | 2000051402 | * | 2/2000 |
| JP | 2004-91786 A | | 3/2004 |
| JP | 2004352975 | * | 12/2004 |

* cited by examiner

*Primary Examiner*—David Buttner
(74) *Attorney, Agent, or Firm*—Sughrue Mion, PLLC

(57) ABSTRACT

The invention provides a molded polymer material which is obtained by subjecting a polymer composition that includes (A) at least one polymer containing $\alpha,\beta$-ethylenically unsaturated carboxylic acid, (B) at least one diene polymer, (C) at least one metal cation source, and (D) at least one organic peroxide, and has a chemical structure arrived at by neutralizing some or all of the carboxyl groups in component A with component C in the presence of component B, to molding and crosslinking under the influence of radicals generated by decomposing component D. The molded polymer material has a high resilience, a high hardness and a good durability, making it well-suited for use in golf balls.

36 Claims, No Drawings

MOLDED POLYMER MATERIAL AND GOLF BALL

BACKGROUND OF THE INVENTION

The present invention relates to molded polymer materials having a high resilience, a high hardness and a good durability which are useful in various types of sporting goods and as industrial materials. The invention relates in particular to molded polymer materials suitable for use as one-piece golf balls and as multi-layer solid golf ball materials, and to golf balls made with such molded polymer materials.

Many golf ball materials have been disclosed recently. For example, U.S. Pat. No. 6,930,150 teaches polymer mixtures in which there is formed a pseudo-crosslinked structure or a semi-interpenetrating network structure.

However, such polymer mixtures lack the performance of a high-resilience material capable of enduring use as a one-piece golf ball or a golf ball core responsible for substantially all the rebound performance of the golf ball. Therefore, when such polymer mixtures are used as golf ball materials, the resulting golf balls have a lower rebound than golf balls made with known rubber compositions for golf balls.

SUMMARY OF THE INVENTION

It is therefore an object of the present invention to provide molded polymer materials having a high resilience, high hardness and good durability. Another object of the invention is to provide golf balls made using such molded polymer materials.

We have conducted extensive investigations, in the course of which we have created a molded polymer material obtained by subjecting a polymer composition that includes (A) at least one polymer containing an $\alpha,\beta$-ethylenically unsaturated carboxylic acid, (B) at least one diene polymer, (C) at least one metal cation source and (D) at least one organic peroxide, and has a chemical structure arrived at by neutralizing some or all of the carboxyl groups in component A with component C in the presence of component B, to molding and crosslinking under the influence of radicals generated by decomposing component D. On evaluating the properties of this molded polymer material, we have discovered that it has a high hardness, a high resilience and a high durability, making it ideally suited for use in golf balls and various other types of sporting goods, and as industrial materials. In particular, we have found that by using the above molded polymer material as the material for a golf ball core or a one-piece golf ball, the durability and distance traveled by the golf ball can be greatly enhanced.

Accordingly, the invention provides the following molded polymer materials and golf balls.

[1] A molded polymer material obtained by subjecting a polymer composition comprising:

(A) at least one polymer containing $\alpha,\beta$-ethylenically unsaturated carboxylic acid, (B) at least one diene polymer, (C) at least one metal cation source, and (D) at least one organic peroxide, and having a chemical structure arrived at by neutralizing some or all of the carboxyl groups in component A with component C in the presence of component B, to molding and crosslinking under the influence of radicals generated by decomposing component D.

[2] The molded polymer material of [1], wherein component A is a copolymer of an $\alpha$-olefin and an $\alpha,\beta$-ethylenically unsaturated carboxylic acid.

[3] The molded polymer material of [2], wherein the $\alpha$-olefin is selected from the group consisting of ethylene, propylene, butene, pentene, hexene, heptene, methylbutene and methylpentene.

[4] The molded polymer material of [1] or [2], wherein the $\alpha,\beta$-ethylenically unsaturated carboxylic acid is selected from the group consisting of acrylic acid, methacrylic acid, ethacrylic acid, itaconic acid, maleic acid and fumaric acid.

[5] The molded polymer material of [1], wherein component B is selected from the group consisting of butadiene rubber, isoprene rubber and styrene-butadiene rubber.

[6] The molded polymer material of [1], wherein the metal cation of component C is selected from the group consisting of magnesium, aluminum, calcium, manganese, tungsten, titanium, iron, cobalt, nickel, hafnium, copper, zinc, barium, zirconium, and tin.

[7] The molded polymer material of [6], wherein the metal cation source used as component C is a metal oxide.

[8] The molded polymer material of [7] which includes at least one metal oxide having an average particle size of at most 600 nm.

[9] The molded polymer material of [7] which includes at least one metal oxide having an average particle size of at most 200 nm.

[10] The molded polymer material of [7], wherein the metal oxide is selected from the group consisting of zinc oxide, magnesium oxide and calcium oxide.

[11] The molded polymer material of [1], wherein component D is an organic peroxide having a 10-hour half-life temperature of at least 80° C.

[12] The molded polymer material of [1], wherein the polymer composition additionally comprises (E) a metal salt of an $\alpha,\beta$-ethylenically unsaturated carboxylic acid monomer.

[13] The molded polymer material of [12], wherein the metal salt of component E is selected from the group consisting of zinc, magnesium and calcium.

[14] The molded polymer material of [12], wherein the unsaturated carboxylic acid monomer of component E is selected from the group consisting of acrylic acid, methacrylic acid, ethacrylic acid, itaconic acid, maleic acid and fumaric acid.

[15] The molded polymer material of [1], wherein component B is included in an amount, based on the combined weight of components A and B, within a range of 10 to 99 wt %.

[16] The molded polymer material of [1], wherein component B is included in an amount, based on the combined weight of components A and B, within a range of 50 to 99 wt %.

[17] A golf ball which is a one-piece golf ball or a multi-layer golf ball that includes a core and one or more cover layer enclosing the core, comprising at least one member selected from among the one-piece golf ball, the core and the one or more cover layer which is formed of a molded polymer material obtained by subjecting a polymer composition comprising:

(A) at least one polymer containing an $\alpha,\beta$-ethylenically unsaturated carboxylic acid, (B) at least one diene polymer, (C) at least one metal cation source, and (D) at least one organic peroxide, and having a chemical structure arrived at by neutralizing some or all of the carboxyl groups in component A with component C in the presence of component B, to molding and crosslinking under the influence of radicals generated by decomposing component D.

[18] The golf ball of [17], wherein component A is a copolymer of an α-olefin and an α,β-ethylenically unsaturated carboxylic acid.

[19] The molded polymer material of [18], wherein the α-olefin is selected from the group consisting of ethylene, propylene, butene, pentene, hexene, heptene, methylbutene and methylpentene.

[20] The molded polymer material of [17] or [18], wherein the α,β-ethylenically unsaturated carboxylic acid is selected from the group consisting of acrylic acid, methacrylic acid, ethacrylic acid, itaconic acid, maleic acid and fumaric acid.

[21] The molded polymer material of [17], wherein component B is selected from the group consisting of butadiene rubber, isoprene rubber and styrene-butadiene rubber.

[22] The molded polymer material of [17], wherein the metal cation of component C is selected from the group consisting of magnesium, aluminum, calcium, manganese, tungsten, titanium, iron, cobalt, nickel, hafnium, copper, zinc, barium, zirconium, and tin.

[23] The molded polymer material of [22], wherein the metal cation source used as component C is a metal oxide.

[24] The molded polymer material of [23] which includes at least one metal oxide having an average particle size of at most 600 nm.

[25] The molded polymer material of [23] which includes at least one metal oxide having an average particle size of at most 200 nm.

[26] The molded polymer material of [23], wherein the metal oxide is selected from the group consisting of zinc oxide, magnesium oxide and calcium oxide.

[27] The molded polymer material of [17], wherein component D is an organic peroxide having a 10-hour half-life temperature of at least 80° C.

[28] The molded polymer material of [17], wherein the polymer composition additionally comprises (E) a metal salt of an α,β-ethylenically unsaturated carboxylic acid monomer.

[29] The molded polymer material of [28], wherein the metal salt of component E is selected from the group consisting of zinc, magnesium and calcium.

[30] The molded polymer material of [28], wherein the unsaturated carboxylic acid monomer of component E is selected from the group consisting of acrylic acid, methacrylic acid, ethacrylic acid, itaconic acid, maleic acid and fumaric acid.

[31] The molded polymer material of [17], wherein component B is included in an amount, based on the combined weight of components A and B, within a range of 10 to 99 wt %.

[32] The molded polymer material of [17], wherein component B is included in an amount, based on the combined weight of components A and B, within a range of 50 to 99 wt %.

DETAILED DESCRIPTION OF THE INVENTION

The invention is described more fully below.

The invention provides a molded polymer material obtained by crosslinking a polymer composition which includes components A to D below:

(A) at least one polymer containing α,β-ethylenically unsaturated carboxylic acid, (B) at least one diene polymer, (C) at least one metal cation source, and (D) at least one organic peroxide.

In another preferred embodiment of the invention, the foregoing rubber composition additionally includes (E) a metal salt of an α,β-ethylenically unsaturated carboxylic acid monomer.

(A) Polymer Containing an α,β-Ethylenically Unsaturated Carboxylic Acid

Component A may be (i) an α,β-ethylenically unsaturated carboxylic acid polymer, or (ii) a copolymer of an α-olefin with an α,β-ethylenically unsaturated carboxylic acid.

The α-olefin is preferably selected from the group consisting of ethylene, propylene, butene, pentene, hexene, heptene, methylbutene and methylpentene.

The α,β-ethylenically unsaturated carboxylic acid is preferably selected from the group consisting of acrylic acid, methacrylic acid, ethacrylic acid, itaconic acid, maleic acid and fumaric acid.

Commercial products, such as that manufactured by DuPont-Mitsui Polychemicals Co., Ltd. under the trade name Nucrel N2050H, may be used as this polymer.

(B) Diene Polymer

Component B is most preferably a polybutadiene. The polybutadiene is preferably one having a cis-1,4 bond content of at least 60%, a 1,2-vinyl bond content of not more than 4%, a Mooney viscosity ($ML_{1+4}$ (100° C.)) of 35 to 65, a weight-average molecular weight (Mw) of 450,000 to 850,000, and a weight-average molecular weight (Mw) to number-average molecular weight (Mn) ratio of 5 or less. Illustrative examples include polybutadienes synthesized with a nickel catalyst and polybutadienes synthesized with a lanthanide series catalyst, of which the latter is preferred. Suitable commercial products include that manufactured by JSR Corporation under the trade name BR700.

Component B is included in the polymer composition in an amount which, although not subject to any particular limitation, is preferably at least 10 wt %, and more preferably at least 50 wt %, but preferably not more than 99 wt %, and more preferably not more than 95 wt %, based on the combined weight of components A and B. Too little component B may lower the resilience of the molded material. Conversely, too much component B may diminish the molded material durability-improving effect.

(C) Metal Cation Source

No particular limitation is imposed on the metal cation of component C, although the metal may be suitably selected from the group consisting of magnesium, aluminum, calcium, manganese, tungsten, titanium, iron, cobalt, nickel, hafnium, copper, zinc, barium, zirconium, and tin.

The metal cation source used as component C is preferably a metal oxide. Of the metal oxide or oxides used in the invention, at least one metal oxide has an average particle size of preferably at most 600 nm, and more preferably at most 200 nm. Specific examples of the metal oxide include zinc oxide, magnesium oxide and calcium oxide.

The amount of component C per 100 parts by weight of components A and B combined is preferably 1 to 50 parts by weight, and more preferably 2 to 30 parts by weight. If too little component C is included in the polymer composition, the neutralization reaction may not proceed to a sufficient degree, whereas too much component C may result in an excessive rise in the weight of the molded material.

(D) Organic Peroxide

The organic peroxide is included in the rubber composition as a free radical initiator. Exemplary organic peroxides are dicumyl peroxide and 1,1-(t-butylperoxy)-3,3,5-trimethylcyclohexane. These organic peroxides may be commercial products, illustrative examples of which include Percumyl D (NOF Corporation), Perhexa 3M (NOF Corporation), Perhexa C (NOF Corporation, and Luperco 231XL (Atochem Co.). If necessary, two or more different organic peroxides may be mixed and used together.

It is preferable for the organic peroxide of component D to have a 10-hour half life temperature of at least 80° C.

Component D is included in an amount, per 100 parts by weight of components A and B combined, of preferably at least 0.05 part by weight, more preferably at least 0.1 part by weight, and even more preferably at least 0.3 part by weight, but preferably not more than 10 parts by weight, and more preferably not more than 5 parts by weight. Too little component D may prevent the molded material from achieving the necessary hardness, whereas too much may make the molded material too hard.

(E) Metal Salt of an $\alpha,\beta$-Ethylenically Unsaturated Carboxylic Acid Monomer In component E, the metal salt is preferably selected from the group consisting of zinc, magnesium and calcium.

The unsaturated carboxylic acid monomer of above component E is preferably selected from the group consisting of acrylic acid, methacrylic acid, ethacrylic acid, itaconic acid, maleic acid and fumaric acid.

Component E is included in an amount, per 100 parts by weight of components A and B combined, of preferably at least 5 parts by weight, and more preferably at least 10 parts by weight, but preferably not more than 60 parts by weight, and more preferably not more than 50 parts by weight. Too little component E may keep the molded material from achieving the necessary hardness, thus compromising the resilience and durability. On the other hand, too much may make the molded material too hard.

One example of a commercial product that may be used as component E is the zinc acrylic produced by Nippon Shokubai Co., Ltd.

If necessary, various additives may also be included in the above-described composition. Examples of such additives include sulfur, antioxidants, barium sulfate, organosulfur compounds such as the zinc salt of pentachlorothiophenol, and zinc stearate. The amounts of these additives may be adjusted as appropriate for their respective purposes and are not subject to any particular limitation.

The rubber composition containing above components A to D and optionally containing component E has a chemical structure arrived at by neutralizing some or all of the carboxyl groups in component A with component C in the presence of component B. This rubber composition is then molded, giving a molded and crosslinked material. The method used to mix these components, while not subject to any particular limitation, is exemplified by the following sequence of mixing steps. Components A and B are thoroughly mixed in a pressure kneader for rubber, following which component C is added at a rubber temperature of at least 100° C., and preferably 120° C., and mixing is carried out at a rotor speed of 20 to 40 rpm for 3 to 20 minutes. The resulting mixture is then cooled, after which component D is added and mixing is carried out at a rubber temperature of 100° C. or less, and preferably 80° C. or less, following which molding under heat and pressure is carried out.

In the practice of the invention, the molded polymer material may be obtained by using a suitable apparatus, such as a roll mill, kneader or Banbury mixer, to masticate the above rubber composition, then molding the mixture under heat and pressure in a mold. Such a molded polymer material is well-suited for use in, for example, one-piece golf balls or the solid core or cover members (including, for example, the mantle layer or the outermost layer) of solid golf balls having a multi-layer construction.

Conventional conditions may be used as these vulcanizing conditions. For example, vulcanization may be carried out at a temperature of 100 to 200° C. for a period of 10 to 40 minutes. When a solid golf ball having a multi-layer construction, such as a two-piece ball, is produced, the cover envelopes, either directly or over an intervening mantle layer, the solid core made of the above-described rubber composition. In such a case, it is preferable to use conventional cover materials, such as ionomer resin, polyester, polyurethane or nylon, as the mantle layer and cover materials. If the golf ball has a thread-wound core, use may be made of a core of this type that is known to the art; such a thread-wound core can be obtained by a method commonly practiced in the art. Alternatively, the golf ball may be produced by using the inventive molded material to envelope the outer surface of a golf ball core made of a known core composition.

No particular limitation is imposed on the surface hardness of the above-described molded polymer material, although a JIS-C hardness of at least 35 is preferred.

The golf ball of the invention is one in which the above-described molded polymer material serves as a member thereof. The form of the ball is not subject to any particular limitation. For example, the ball may be a one-piece solid golf ball in which direct use is made of the above-described molded polymer material, a two-piece solid golf ball wherein the molded polymer material serves as a solid core on the surface of which a cover has been formed, and a multi-piece solid golf ball composed of three or more pieces wherein the molded polymer material serves as a solid core over which two or more cover layers have been formed.

The inventive golf ball may be produced in accordance with the Rules of Golf for use in competitive play. That is, the ball may be manufactured to a diameter of not less than 42.67 mm and a weight of not more than 45.93 g.

The molded polymer material of the invention has a high hardness and a high resilience, and also exhibits a high durability index, making it particularly suitable as a material for a variety of sporting goods that require durability and toughness, including spikes on various types of athletic footwear, ski equipment such as ski boots, golf balls, and tennis rackets. The inventive molded polymer material is also useful as an industrial material such as for automotive parts. In particular, golf balls in which the molded polymer material of the invention is used have a high rebound and a large initial velocity, enabling the distance traveled by the ball to be improved. Such golf balls also have a good feel when hit. In addition, they are not subject to cracking even when repeatedly struck, making it possible to impart a high durability. Hence, the inventive golf balls are of a high quality and beneficial for competitive play.

EXAMPLES

The following Examples of the invention and Comparative Examples are provided by way of illustration and not by way of limitation.

Examples 1

Comparative Example 1

Rubber compositions were formulated from the ingredients shown in Table 1 below.

TABLE 1

|  | Example 1 | Comparative Example 1 |
|---|---|---|
| Polybutadiene rubber | 80 | 100 |
| Ethylene-methacrylic acid copolymer | 20 | 0 |
| Zinc oxide (ZnO) | 14.6 | 14.6 |
| Zinc acrylate (zinc diacrylate) | 20 | 20 |
| Antioxidant | 0.2 | 0.2 |
| Organic peroxide | 1 | 1 |

Note:
Numbers in the table indicate parts by weight

Details on each of the ingredients in the table are given below.
Polyurethane rubber: A polybutadiene rubber produced by JSR Corporation under the trade name BR700.
Ethylene-methacrylic acid copolymer: Produced by DuPont-Mitsui Polychemicals Co., Ltd. under the trade name N2050H (acid content of ethylene-methacrylic acid copolymer, 20 wt %).
Zinc oxide: Produced by Sakai Chemical Industry Co., Ltd. under the trade name Finex-25 (average particle size, 600 nm).
Zinc acrylate: Zinc diacrylate produced by Nippon Shokubai Co., Ltd.
Antioxidant: Produced by Ouchi Shinko Chemical Industry Co., Ltd. under the trade name Nocrac NS-6. Chemical name is 2,2'-methylenebis(4-methyl-6-t-butylphenol).
Organic peroxide: Dicumyl peroxide produced by NOF Corporation under the trade name Percumyl D.

Mixture and Molding of the Polymer Composition

First, the above polybutadiene rubber and the ethylene-methacrylic acid copolymer were mixed at 30 rpm for 10 minutes in a Plastomill (manufactured by Toyo Seiki Seisaku-Sho, Ltd.). The ultimate temperature during mixing was set at 95 to 100° C.

In a second step, the zinc oxide was added to the resulting mixture, and mixing was carried out at 30 rpm for 5 minutes in the Plastomill at a temperature setting of 85° C. Next, the temperature setting was raised to 150° C. and mixing was carried out at 30 rpm for 5 minutes in the Plastomill. The mixture was then discharged and cooled.

In a third step, the zinc acrylate and the antioxidant were added, and mixing was carried out at 40 rpm for 5 minutes in the Plastomill at a temperature setting of 100° C. The mixture was then discharged and cooled.

Finally, the organic peroxide was added, and mixing was carried out on a roll mill.

The polymer composition (more precisely, the polymer mixture) obtained from the above steps was vulcanized (pressure molded) at 170° C. for 15 minutes, thereby forming a molded polymer material A in the form of a 1 mm thick sheet. The hardness and breaking stress of this molded polymer material A are shown in Table 2 below.

TABLE 2

|  | Example 1 | Comparative Example 1 |
|---|---|---|
| JIS-C hardness | 53.6 | 54.3 |
| Tensile stress at break (MPa) | 7.971 | 6.608 |

Notes:
(1) The JIS-C hardness is based on "Physical Test Methods for Vulcanized Rubber (Test Category (3): Hardness Tests)" in JIS K-6301.
(2) The tensile stress at break (MPa) is based on "Physical Test Methods for Vulcanized Rubber (Test Category (1): Tensile Tests)" in JIS K-6301.

In addition, the polymer composition (more precisely, the polymer mixture) obtained from the above steps was vulcanized (pressure molded) at 170° C. for 30 minutes, thereby forming a molded polymer material B in the form of a rubber ball for use as a one-piece molded polymer material. The physical properties of this molded material B (one-piece golf ball) as a ball are shown in Table 3 below.

TABLE 3

|  | Example 1 | Comparative Example 1 |
|---|---|---|
| Ball diameter (mm) | 42.7 | 42.7 |
| Weight (g) | 43.4 | 43.5 |
| Deflection (mm) | 5.14 | 5.27 |
| Coefficient of restitution (COR) | 0.742 | 0.738 |
| Impact durability index | 126 | 100 |

Deflection
The molded ball was placed on a hard plate, and the deflection (mm) when subjected to a final load of 1,275 N (130 kgf) from an initial load of 98 N (10 kgf) was measured.

Coefficient of Restitution
The ball was fired from an air cannon against a steel plate at a velocity of 45 m/s, and the rebound velocity was measured. The coefficient of restitution (COR) is the ratio of the rebound velocity to the initial velocity of the ball.

Impact Durability Index
The durability of the golf ball was evaluated using an ADC Ball COR Durability Tester produced by Automated Design Corporation (U.S.). This tester has the ability to fire a golf ball using air pressure and cause it to repeatedly strike two metal plates arranged in parallel. The average number of firings needed until a ball cracks was treated as the durability. The incident velocity of the ball on the metal plates was 45 m/s. The value for Example 1 was expressed as an index based on a value of "100" for the durability of the ball in Comparative Example 1.

As is apparent from the results in Table 3, the molded polymer material in Example 1 according to the invention had a very high durability while retaining a rebound and a hardness comparable with those obtained in the comparative example.

The invention claimed is:
1. A molded polymer material obtained from a polymer composition comprising:
(A) at least one un-neutralized polymer containing α,β-ethylenically unsaturated carboxylic acid,

(B) at least one diene polymer, which is a polybutadiene synthesized with a lanthanide series catalyst and having a cis-1,4 bond content of at least 60%, a 1,2-vinyl bond content of not more than 4%, a Mooney viscosity ($ML_{1+4}$(100° C.)) of 35 to 65, a weight-average molecular weight (Mw) of 450,000 to 850,000, and a weight-average molecular weight (Mw) to number-average molecular weight (Mn) ratio of 5 or less;

(C) at least one metal cation source, (D) at least one organic peroxide, and (E) a metal salt of an α,β-ethylenically unsaturated carboxylic acid monomer;

wherein the molded polymer material is obtained by:

(i) mixing components A and B;

(ii) adding component C to the resulting mixture, thereby neutralizing some or all of the carboxyl groups in component A with component C in the presence of component B;

(iii) adding component E; and (iv) adding component D and molding and crosslinking under the influence of radicals generated by decomposing component D, wherein component A is an un-neutralized polymer consisting of an α,β-ethylenically unsaturated carboxylic acid.

2. The molded polymer material of claim 1, wherein the α,β-ethylenically unsaturated carboxylic acid is selected from the group consisting of acrylic acid, methacrylic acid, ethacrylic acid, itaconic acid, maleic acid and fumaric acid.

3. The molded polymer material of claim 1, wherein the metal cation of component C is selected from the group consisting of magnesium, aluminum, calcium, manganese, tungsten, titanium, iron, cobalt, nickel, hafnium, copper, zinc, barium, zirconium, and tin.

4. The molded polymer material of claim 3, wherein the metal cation source used as component C is a metal oxide.

5. The molded polymer material of claim 4 which includes at least one metal oxide having an average particle size of at most 600 nm.

6. The molded polymer material of claim 4 which includes at least one metal oxide having an average particle size of at most 200 nm.

7. The molded polymer material of claim 4, wherein the metal oxide is selected from the group consisting of zinc oxide, magnesium oxide and calcium oxide.

8. The molded polymer material of claim 1, wherein component D is an organic peroxide having a 10-hour half-life temperature of at least 80° C.

9. The molded polymer material of claim 1, wherein the metal salt of component E is selected from the group consisting of zinc, magnesium and calcium.

10. The molded polymer material of claim 1, wherein the unsaturated carboxylic acid monomer of component E is selected from the group consisting of acrylic acid, methacrylic acid, ethacrylic acid, itaconic acid, maleic acid and fumaric acid.

11. The molded polymer material of claim 1, wherein component B is included in an amount, based on the combined weight of components A and B, within a range of 10 to 99 wt %.

12. The molded polymer material of claim 1, wherein component B is included in an amount, based on the combined weight of components A and B, within a range of 50 to 99 wt %.

13. The molded polymer material of claim 1, wherein the amount of component C is from 1 to 50 parts by weight per 100 parts by weight of components A and B combined.

14. The molded polymer material of claim 1, wherein the amount of component D is from 0.05 to 10 parts by weight per 100 parts by weight of components A and B combined.

15. The molded polymer material of claim 1, wherein the amount of component E is from 5 to 60 parts by weight per 100 parts by weight of components A and B combined.

16. The molded polymer material of claim 1, wherein the polymer composition further comprises organosulfur compounds.

17. The molded polymer material of claim 1, wherein the polymer composition further comprises zinc stearate.

18. The molded polymer material of claim 1, wherein component B is included in an amount, based on the combined weight of components A and B, within a range of 50 to 80 wt %.

19. A golf ball which is a one-piece golf ball or a multi-layer golf ball that includes a core and one or more cover layer enclosing the core, comprising at least one member selected from among the one-piece golf ball, the core and the one or more cover layer which is formed of a molded polymer material obtained from a polymer composition comprising:

(A) at least one un-neutralized polymer containing an α,β-ethylenically unsaturated carboxylic acid, (B) at least one diene polymer, which is a polybutadiene synthesized with a lanthanide series catalyst and having a cis-1,4 bond content of at least 60%, a 1,2-vinyl bond content of not more than 4%, a Mooney viscosity ($ML_{1+4}$(100° C.)) of 35 to 65, a weight-average molecular weight (Mw) of 450,000 to 850,000, and a weight-average molecular weight (Mw) to number-average molecular weight (Mn) ratio of 5 or less;

(C) at least one metal cation source, (D) at least one organic peroxide, and (E) a metal salt of an α, β-ethylenically unsaturated carboxylic acid monomer;

wherein the molded polymer material is obtained by:

(i) mixing components A and B;

(ii) adding component C to the resulting mixture, thereby neutralizing some or all of the carboxyl groups in component A with component C in the presence of component B;

(iii) adding component E; and (iv) adding component D and molding and crosslinking under the influence of radicals generated by decomposing component D, wherein component A is an un-neutralized polymer consisting of an α,β-ethylenically unsaturated carboxylic acid.

20. The golf ball of claim 19, wherein the α, β-ethylenically unsaturated carboxylic acid is selected from the group consisting of acrylic acid, methacrylic acid, ethacrylic acid, itaconic acid, maleic acid and fumaric acid.

21. The golf ball of claim 19, wherein the metal cation of component C is selected from the group consisting of magnesium, aluminum, calcium, manganese, tungsten, titanium, iron, cobalt, nickel, hafnium, copper, zinc, barium, zirconium, and tin.

22. The golf ball of claim 21, wherein the metal cation source used as component C is a metal oxide.

23. The golf ball of claim 22 which includes at least one metal oxide having an average particle size of at most 600 nm.

24. The golf ball of claim 22 which includes at least one metal oxide having an average particle size of at most 200 nm.

25. The golf ball of claim 22, wherein the metal oxide is selected from the group consisting of zinc oxide, magnesium oxide and calcium oxide.

26. The golf ball of claim 19, wherein component D is an organic peroxide having a 10-hour half-life temperature of at least 80° C.

27. The golf ball of claim 19, wherein the metal salt of component E is selected from the group consisting of zinc, magnesium and calcium.

28. The golf ball of claim 19, wherein the unsaturated carboxylic acid monomer of component E is selected from the group consisting of acrylic acid, methacrylic acid, ethacrylic acid, itaconic acid, maleic acid and fumaric acid.

29. The golf ball of claim 19, wherein component B is included in an amount, based on the combined weight of components A and B, within a range of 10 to 99 wt %.

30. The golf ball of claim 19, wherein B is included in an amount, based on the combined weight of components A and B, within a range of 50 to 99 wt %.

31. The golf ball of claim 19, wherein the amount of component C is from 1 to 50 parts by weight per 100 parts by weight of components A and B combined.

32. The golf ball of claim 19, wherein the amount of component D is from 0.05 to 10 parts by weight per 100 parts by weight of components A and B combined.

33. The golf ball of claim 19, wherein the amount of component E is from 5 to 60 parts by weight per 100 parts by weight of components A and B combined.

34. The golf ball of claim 19, wherein the polymer composition further comprises organosulfur compounds.

35. The golf ball of claim 19, wherein the polymer composition further comprises zinc stearate.

36. The molded polymer material of claim 19, wherein component B is included in an amount, based on the combined weight of components A and B, within a range of 50 to 80 wt %.

\* \* \* \* \*